May 27, 1952  R. E. KRUEGER, III  2,598,274
FLOW REGULATOR, PRESSURE RELIEF VALVE AND THE LIKE
Filed Jan. 19, 1945
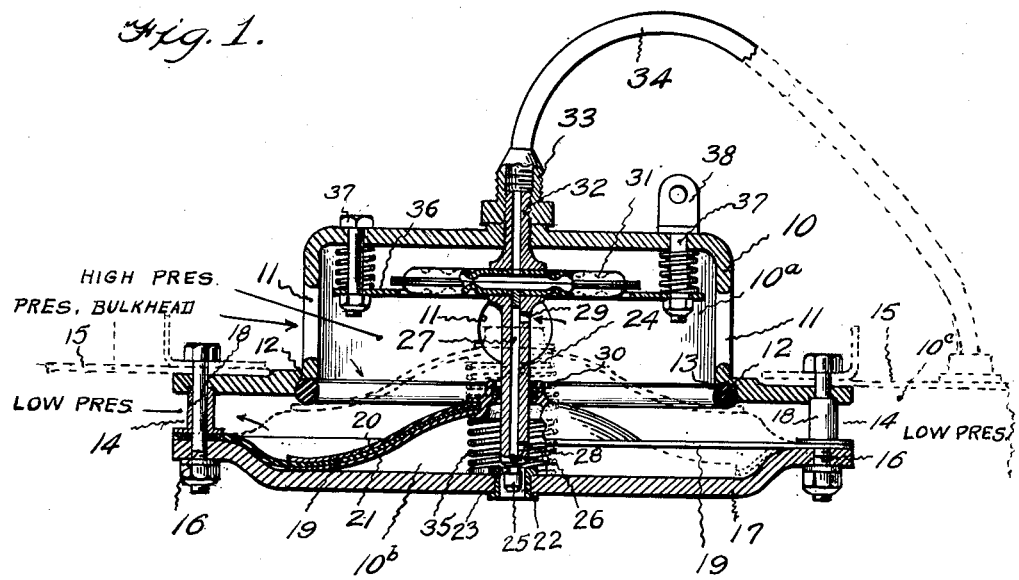
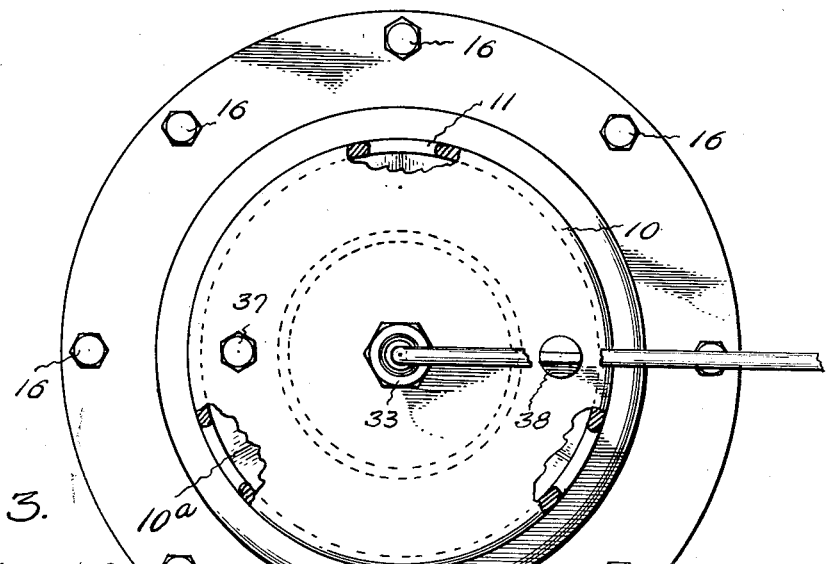
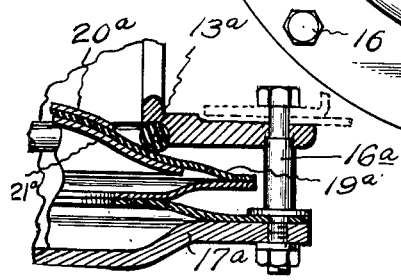
Inventor
RUDOLPH E. KRUEGER
By Irving A. W. Cathran
Attorney Patented May 27, 1952

2,598,274

UNITED STATES PATENT OFFICE 2,598,274

FLOW REGULATOR, PRESSURE RELIEF VALVE AND THE LIKE

Rudolph E. Krueger, III, Downey, Calif.

Application January 19, 1945, Serial No. 573,604

11 Claims. (Cl. 98—1.5)

This invention relates to pressure relief valves, and the like, for controlling the communication between two compartments, one a low pressure and the other a high pressure compartment. One of the objects of this invention is the production of a simple and efficient means for controlling the pressure differential between such compartments.

Another object of this invention is the production of a pressure relief valve constructed to maintain a sealed port until the prescribed pressure differential is reached, and to then abruptly open the port to the opening required to prevent the pressure in the high pressure chamber from exceeding the above mentioned prescribed pressure differential, up to the capacity of the valve.

Other objects and advantages of the present invention will appear throughout the following specifications and claims.

In the drawings:

Figure 1 is a vertical sectional view illustrating the pressure relief valve;

Figure 2 is a top plan view thereof, certain parts being shown in section;

Figure 3 is an enlarged fragmentary sectional view illustrating a modified type of diaphragm valve.

By referring to the drawings, it will be seen that 10 designates the valve casing illustrated in Figure 1, having air flow openings 11 in the side portions thereof. The casing 10 is provided with an annular recess, in which is fixed a rubber ring or other suitable valve seat member 13. The casing 10 is also provided with an annular opening 14 located below the openings 11. The casing 10 is preferably secured to the conventional pressure bulkhead 15 shown in dotted lines in Figure 1 by means of bolts 16. These bolts 16 also secure the bottom plate 17 of the casing 10 in place, as shown also in Figure 1. The bolts 16 carry collars 18 which space the bottom plate 17 from the upper portion of the casing, thereby defining the opening or low pressure compartment 14 at the periphery of the casing 10.

Communication between the openings 11 and 14 is controlled by a diaphragm valve including a flexible diaphragm the periphery of which is anchored under the collars 18. The diaphragm valve includes a central valve portion, reinforced by discs 20 and 21, between which the central portion of the diaphragm is clamped. These discs may be made of spring flexible metal. The disc 20 functions as a valve closure element and is of sufficient size to contact the valve seat ring 13 to establish the closed position of the valve. The disc 21 is of sufficient size to contact the bottom plate 17 adjacent the periphery of the disc 21 when the valve is in an open position. When so constructed these discs 20 and 21 will shield the diaphragm 19 against wear when contacting the ring 13 or bottom plate 17.

The bottom plate 17 is provided with a pilot valve port 22 at the center thereof, in which is fitted a valve seat 23. A pilot valve stem 24 is carried within the casing 10 and is provided with a depending end 25 which is reduced in size relative to the stem 24 and is provided with a shoulder 26 which functions as a pilot valve and is adapted to seat upon the pilot valve seat 23 and close the port 22. The stem 24 is provided with a longitudinal bleed passageway 27 having an opening 28 near the bottom thereof to communicate with a control chamber $10^b$ which is defined between the diaphragm valve 19—21 and the bottom plate 17. The stem 24 is also provided with an opening 29 which provides communication between the upper end of the passageway 27 and the high pressure compartment $10^a$ within the casing 10 located above the diaphragm 19. The diaphragm 19 carries a central slidable sealing collar 30 which fits around and is slideably mounted upon the stem 24. A sealing gasket is carried by the collar 30, as shown.

The upper end of the stem 24 supports a spring bellows 31. The passageway 27 is sealed from the interior of the bellows 31. This bellows 31 is preferably constructed of sheet metal or other flexible material similar to the bellows of a thermostat or aneroid barometer. The bellows 31 is connected to an upwardly extending hollow stem 32, which stem is externally threaded and is adjustably secured to the top of the casing 10 by means of a nipple 33, the nipple 33 being connected to one end of a tube 34 leading to the low pressure side beyond the bulkhead 13— see Figure 1. Consequently, the bellows 31 will be subjected to low pressure within, and to high pressure without, thus tending to collapse the bellows. The pressure differential required to operate the valve stem 24 and move the shoulder 26 on and off the seat 23, may be changed by adjusting the stem 32 within the nipple 33 to vary the tension on the spring bellows 31. An expansion coil spring 35 surrounds the lower end of the stem 24 and rests upon the bottom plate 17 within the control chamber $10^b$.

The upper end of the spring 35 supports the central portion of the diaphragm valve 19—21 near the collar 30 and normally exerts pressure upwardly. This allows the valve 19—21 to remain closed normally even when the pressure differential across the pressure bulkhead is 0.

A bellows lifting plate 36 is yieldably hung from the casing 10 by means of the suspending bolts 37. A lifting connection 38 is carried by one of the bolts 37 and this connection 38 may be secured to any suitable lifting device.

In Figure 3, there is shown a modified type of diaphragm valve wherein a bellows-like valve 19$^a$ is anchored to the plate 17$^a$ by means of bolts 16$^a$. The valve 19$^a$ is preferably formed of rubber or other flexible material and is provided with an inner reinforcing disc 21$^a$ and an outer disc 20$^a$, the edge of the disc 21$^a$ extending under that portion of the valve 19$^a$ which contacts the rubber valve seat ring 13$^a$ and the disc 20$^a$ terminating short of the ring 13$^a$, thereby providing a rubber to rubber contact between the ring 13$^a$ and the valve 19$^a$. The diaphragm valve is preferably made of "neoprene" rubber, but it may be made of any flexible material including metal, metal being preferable for high pressure valves. The side walls of the bellows-like valve 19$^a$ are Z-shaped in cross section, as shown in Figure 3. Attention is directed to the fact that the flexible bellows 19$^a$ extends beyond the outer circumference of the plate 21$^a$, thus insuring that a free annular edge of the rubber bellows 19$^a$ will be outermost with relation to the rubber ring 13$^a$. This construction will thus provide a flexible rubber lip resting against the ring 13$^a$ and being free to flex independently of the plate 21$^a$. In cases therefore when solid particles are entrapped between faces of members 19$^a$ and 13$^a$ the free material of the member 19$^a$ will conform to the solid particle and will prevent leakage through the valve.

While the present device may be particularly used for regulating and relieving pressure within airplane cabins, the device may be used in any structure where pressure is to be regulated or controlled upon opposite sides of a bulkhead, such as the bulkhead 15 shown in dotted lines in Figure 1. It should be noted that a pilot-controlled relief valve has the virtue of holding pressure without leakage to a predetermined value, then opening the valve abruptly to the full open position, thereby allowing the fluid, air, etc., under pressure to escape until the pressure is lower than the opening pressure, whereupon the valve 19 closes tightly without leakage.

This performance is in contrast to the erratic operation of a spring loaded poppet type of relief valve which requires further pressure to cause the valve to open to a greater extent. Pressure vessels such as an airplane pressure cabin equipped with this improved pressure relief valve structure will reduce the spread between the maximum operating pressure and the relief pressure. Since the device is power operated, in both open and closed positions, the pressure relief valve will be more positive in action than valves of other well known types. It should be understood that the valve 19—21 is held against the seat-ring 13 by means of the spring 35 until sufficient pressure differential is built up to cause the valve 19 to become power operated.

This particular pressure relief valve design is equally suitable for vacuum relief when for any reason the pressure differential across the valve is reversed. When operating as a vacuum relief valve, this valve is also power operated in a reverse manner and will relieve at a low pressure differential as the only force required is that needed to deflect the spring 35 and to flex the valve 19—21.

The operation of the various parts of the pressure relief valve is as follows (Ref.—Figure 1):

The bellows 31 as stated above, is made of sheet metal or other flexible material, and the interior thereof communicates with the low pressure area 10$^c$, through the medium of the passageway 34. The bellows 31 is therefore subjected to low pressure from within by its communication with the area 10$^c$ and is subjected to high pressure without since the bellows is located in the high pressure compartment 10$^a$. Consequently, the bellows 31 will tend to collapse. The main valve 19—21 is normally held in a closed position by the spring 35, and high pressure, air or the like, which flows in through the opening or port 29, down through passageway 27 and into the control chamber 10$^b$. The fact that the pressure in chamber 10$^b$ is higher than that in compartment 10$^c$ furnishes the principal force that holds the valve normally closed. This valve element 20 is sealed in a closed position against the rubber ring 13, which provides a cushion valve seat.

When the bellows 31 collapses, however, the pilot valve 26 at the lower end of the stem 24 is lifted from the seat 23. This allows the high pressure air, etc., under the diaphragm 19 to escape from the control chamber 10$^b$ through the port 22 and the valve 19—21 is pushed to the open position shown in full lines in Figure 1, thereby bleeding the air out of the cabin with which the device is associated. When sufficient air has escaped to readjust the pressure differential, the bellows 31 expands, closing the pilot valve; and high pressure air flowing through ports 29 and 28 lifts the valve 19—21 to the closed position again, as shown in dotted lines in Figure 1. The pressure differential required to operate the diaphragm 19 may be changed by adjusting the spring tension on the bellows 31 through adjustment of the nipple 33 upon the stem 32. As stated above, manual means may be used and attached to the connection 38 for opening the valve 19—21 at the will of an operator. The valve may also be a vacuum relief valve, if desired, in its normal installation so that the valve will open as soon as there is a negative differential.

Operation under pressure differential less than predetermined relief pressure:

In describing the operation of the valve, it should be explained that the compartment 10$^a$ is bounded by the casing 10 and the central portion of the diaphragm valve 19—21, within the seat 12. This compartment is vented to the high pressure area through ports 11. Control chamber 10$^b$ is bounded by the bottom plate 17 and the entire lower side of diaphragm 19. The low pressure area 10$^b$ communicates through opening 14 with the peripheral portion of diaphragm 19 between valve seat 12 and the periphery of the diaphragm 19 where it meets bottom plate 17.

Power for sealing the valve 19—21 is obtained by fluid at cabin pressure flowing through the metering vent in the stem 24 from compartment 10$^a$ to the control chamber 10$^b$, and being confined in the control chamber 10$^b$, the pressure in the control chamber 10$^b$ is equal to that in 10$^a$ but more than that in 10$^c$. The pressure in chamber 10$^b$ times the effective area of 10$^b$ is more than the pressure at 10c times the area at 10c plus the pressure 10a times the area at 10a and thereby power is provided for closing the valve 19—21.

Operation under predetermined relief pressure:

When relief pressure differential is reached, the bellows 31 being vented to low pressure through tube 34 lifts the pilot valve 26 from its seat 23. As the pilot valve has a finite area, a force will be required to lift it from its seat 23, due to the pressure differential existing across the base 17. This force will of necessity be supplied by the contraction of the bellows 31. This feature will cause the pilot valve to be moved farther than a balanced amount due to the fact that the pressure differential on the pilot valve 26 no longer exists. Thus, the pilot valve will be over-displaced, producing the final effect on the pressure relief valve of opening at a predetermined pressure and closing at a slightly lower pressure; this difference may be controlled by the area of pilot valve 26. The pressure in the control chamber 10b then leaks out through the pilot valve vent 22 faster than it can be replenished through the metering port 28. This action reduces or renders negative the closing pressure differential on the valve 19—21 at which time an unbalanced pressure acts on the valve 19—21 thereby causing the valve 19—21 to instantaneously and positively open, allowing the restrained pressure, air, fluid, etc., to escape.

Operation when pressure is reduced to a controllable value:

When the cabin pressure, or the pressure on one side of the bulkhead 15, drops to the predetermined value, the pressure sensitive bellows 31 expands, thereby causing the pilot valve 26 to move to a closed position. With air at the pilot valve closed, the metering vent in the stem 24 quickly supplies the chamber 10b with cabin pressure which causes an unbalanced pressure differential across the valve 19—21, thereby causing the valve 19—21 to close.

It should be noted that the slideable collar 30 which fits around the stem 24 and which is carried by the valve 19—21 carries a flexible sealing packing, preferably of felt, to allow angular displacement of the valve 19—21 without causing a binding action upon the stem 24, while at the same time providing a proper seal. Proper adjustment may be made by turning the threaded stem 32 through the top of the casing 10, the stem 32 preferably having a swivel connection with the bellows 31. This stem 32 when adjusted may be locked in a set position by the nipple 33 which acts as a lock nut to permit the bellows 31 to operate at the required pressure differential.

Having described the invention, what I claim as new is:

1. A device of the class described comprising a casing, said casing having two pressure compartments, the pressure in one of the compartments being controlled and communicating with a normally high pressure region, the other compartment connecting with a relatively low pressure region, a valve seat located at the junction of the compartments, a diaphragm valve carried within the casing and adapted to seat upon said valve seat to establish and interrupt communication between the normally low and high pressure regions, a control chamber formed by the diaphragm valve and a wall of the casing, a pilot valve independent of said diaphragm valve for controlling the pressure in said controlled pressure compartment with respect to a region of lower pressure and normally sealing the control chamber, a stem for said pilot valve, said stem having a passage providing communication between the high pressure region and the control chamber independently of the pilot valve, and means for automatically opening and closing the pilot valve independently of the diaphragm valve under predetermined pressure conditions.

2. A device of the class described comprising a casing, said casing having two pressure compartments, the pressure in one of the compartments being controlled and communicating with a normally high pressure region, the other compartment communicating with a relatively low pressure region, a valve seat located at the junction of the compartments, a diaphragm valve carried within the casing and adapted to seat upon said valve seat to establish and interrupt communication between the normally high and low pressure regions, a control chamber formed by the diaphragm valve and a wall of the casing, a pilot valve independent of said diaphragm valve for controlling the pressure in said controlled pressure compartment with respect to a region of lower pressure and normally sealing the control chamber, a stem for the pilot valve, the stem having a passage providing communication between the high pressure region and the control chamber independently of the pilot valve, and a pressure responsive means engaging said stem for automatically opening and closing said pilot valve under predetermined pressure conditions.

3. A device of the class described comprising a casing, said casing having two pressure compartments, the pressure in one of the compartments being controlled and communicating with a normally high pressure region, the other compartment connecting with a relatively low pressure region, a valve seat located at the junction of said compartments, a diaphragm valve carried within said casing and adapted to seat upon said valve seat to establish and interrupt communication between the normally high and low pressure regions, a control chamber formed by the diaphragm valve and a wall of the casing, a pilot valve independent of said diaphragm valve for controlling the pressure in said control chamber by controlling flow therefrom to a region of lower pressure and normally sealing the control chamber, a bellows within the normally high pressure region and connected interiorly with the low pressure region, a stem connected to said bellows and carrying the pilot valve, said stem having a passage providing communication between the high pressure region and the control chamber independently of the pilot valve, said bellows constituting means for automatically opening and closing said pilot valve independently of said diaphragm valve under predetermined pressure conditions; and means for adjusting said bellows for regulating the opening and closing of said pilot valve relative to the pressure to which said bellows is subjected.

4. A device of the class described comprising a casing, said casing having two pressure compartments, the pressure in one of the compartments being controlled and communicating with a normally high pressure region, the other compartment connecting with a relatively low pressure region, a valve seat located at the junction of said compartments, a diaphragm valve carried within said casing and adapted to seat upon said valve seat to establish and interrupt communication between the normally high and low pressure regions, a control chamber formed by the diaphragm valve and a wall of the casing, a bellows within the normally high pressure region, a pilot valve stem connected to said bellows, a pilot valve carried by said stem for controlling the pressure in said controlled pressure compartment with respect to said lower pressure region and normally sealing the control chamber, said stem having a passage providing communication between the high pressure region and the control chamber independently of the pilot valve, said bellows automatically opening and closing said pilot valve under predetermined pressure conditions, and means for supplying pressure from said low pressure region to the interior of said bellows.

5. A device of the class described comprising a casing, said casing having two pressure compartments, the pressure in one of the compartments being controlled and communicating with a normally high pressure region, the other compartment connecting with a relatively low pressure region, a valve seat located at the junction of said compartments, a diaphragm valve carried within said casing and adapted to seat upon said valve seat and establishing and interrupting communication between said normally high and low pressure regions, a control chamber formed by the diaphragm valve and a wall of the casing, a pilot valve for controlling the pressure in said controlled pressure compartment and normally sealing the control chamber, a stem for the pilot valve having a passage providing communication between the high pressure region and the control chamber independently of the pilot valve, and a bellows disposed within the high pressure region and connected to the pilot valve stem for automatically opening and closing said pilot valve under predetermined pressure conditions, and means for supplying pressure from said low pressure region to the interior of said bellows, said bellows being attached to the casing and supporting said pilot valve stem, and said diaphrgam having a central collar slidably receiving said valve stem.

6. A device of the class described comprising a casing, said casing having two pressure compartments, the pressure in one of the compartments being controlled and communicating with a normally high pressure region, the other compartment connecting with a relatively low pressure region, a valve seat located at the junction of said compartments, a diaphragm valve carried within said casing and adapted to seat upon said valve seat, a control chamber formed by the diaphragm valve and a wall of the casing, a pilot valve for controlling the pressure in said control pressure compartment and normally sealing the control chamber, a stem for the pilot valve having a passage providing communication between the control chamber and the high pressure region independently of said pilot valve, a bellows disposed in the controlled pressure compartment, for automatically opening and closing said pilot valve under predetermined pressure conditions, manually operable means for independently opening said pilot valve irrespective of pressure conditions and means for supplying pressure from said low pressure region to the interior of said bellows.

7. A device of the class described comprising a casing, said casing having two pressure compartments, the pressure in one of the compartments being controlled and communicating with a normally high pressure region, the other compartment connecting with a relatively low pressure region, a valve seat located at the junction of said compartments, a diaphragm valve carried within said casing and having one side adapted to seat upon said valve seat, said one side having its area inwardly of said valve seat subjected to the pressure of said one compartment and having the area outwardly of said valve seat subjected to the pressure of said other compartment a control chamber disposed between the other side of the diaphragm valve and a wall of the casing, said other side of the diaphragm valve being subjected to control chamber pressure throughout its entire area a pilot valve stem extending centrally through the diaphragm valve for controlling the pressure in said controlled pressure compartment and normally sealing the control chamber and the diaphragm, a pilot valve carried by the stem, said stem having a passage providing communication between the control chamber and the high pressure region independently of the pilot valve, means for automatically opening and closing said pilot valve under predetermined pressure conditions, and means for adjusting the first mentioned means to vary the opening and closing of the pilot valve in relation to the pressure differential between said compartments.

8. A device of the class described comprising a casing, said casing having a high pressure compartment and a low pressure compartment, a valve seat located at the junction of said compartments, a diaphragm valve carried within said casing and adapted to seat upon said valve seat to interrupt communication between said compartments, a control chamber formed by the diaphragm valve and a wall of the casing, a pilot valve for relieving pressure from the control chamber and normally sealing the control chamber, a stem carrying said pilot valve having a passage providing communication between the control chamber and the high pressure compartment independently of the pilot valve, means for automatically opening and closing said pilot valve under predetermined pressure conditions, said stem extending through said diaphragm valve, a collar carried by the diaphragm valve, said collar having a compressible packing engaging the stem and slidable thereon for sealing the junction of the stem and diaphragm valve and permitting said diaphragm valve to tilt without binding upon said stem.

9. A device of the class described comprising a casing formed with three compartments, one compartment in direct communication with a high pressure region, another compartment in direct communication with a low pressure region and an intermediate pressure constituting a control chamber, a valve seat between the high and low pressure compartments, a diaphragm valve mounted in the casing and adapted to be moved from a full closed to a full open position by the fluctuations of pressure in the control chamber, the diaphragm valve and a wall of the casing forming the control chamber, a valve seat through said last named wall communicating with the low pressure region, a pilot valve for closing said seat, said pilot valve having a hollow valve stem extending through the valve diaphragm and through which pressure may pass freely from the high pressure compartment to the intermediate pressure compartment, fluid responsive means connected to the valve stem and subjected exteriorly to the pressure in the high pressure compartment, and a connection between the interior of said fluid responsive means and the low pressure region whereby the fluid responsive means will actuate the valve stem in response to a differential of pressure thereon and cause fluctuations of the pressure in the intermediate pressure chamber, thereby moving the diaphragm valve between full open and full closed positions.

10. A device as claimed in 9, wherein said pilot valve, when seated, is subjected to a pressure differential between said control chamber and said low pressure region, which differential is relieved when said pilot valve is opened, so as to amplify the opening movement of said pilot valve and thereby induce the full opening movement of said diaphragm valve.

11. A device as defined in claim 10, wherein said diaphragm has a central collar slidably receiving said stem.

RUDOLPH E. KRUEGER, III.

REFERENCES CITED

The following references are of record in the file of this patent:

UNITED STATES PATENTS

| Number | Name | Date |
| --- | --- | --- |
| 1,545,150 | Lundberg | July 7, 1925 |
| 2,041,922 | Green | May 26, 1936 |
| 2,208,554 | Price | July 16, 1940 |
| 2,224,394 | Jurs | Dec. 10, 1940 |
| 2,307,199 | Cooper | Jan. 5, 1943 |
| 2,316,649 | Jurs | Apr. 13, 1943 |
| 2,335,729 | Bjergel | Nov. 30, 1943 |
| 2,399,326 | Crot | Apr. 30, 1946 |
| 2,419,707 | Cooper et al. | Apr. 29, 1947 |
| 2,463,487 | Widgery et al. | Mar. 1, 1949 |
| 2,515,639 | Draney | July 18, 1950 |